Feb. 22, 1944.                C. E. TYLER                 2,342,382
                    METHOD OF POLYMERIZING ROSIN
                         Filed July 4, 1942
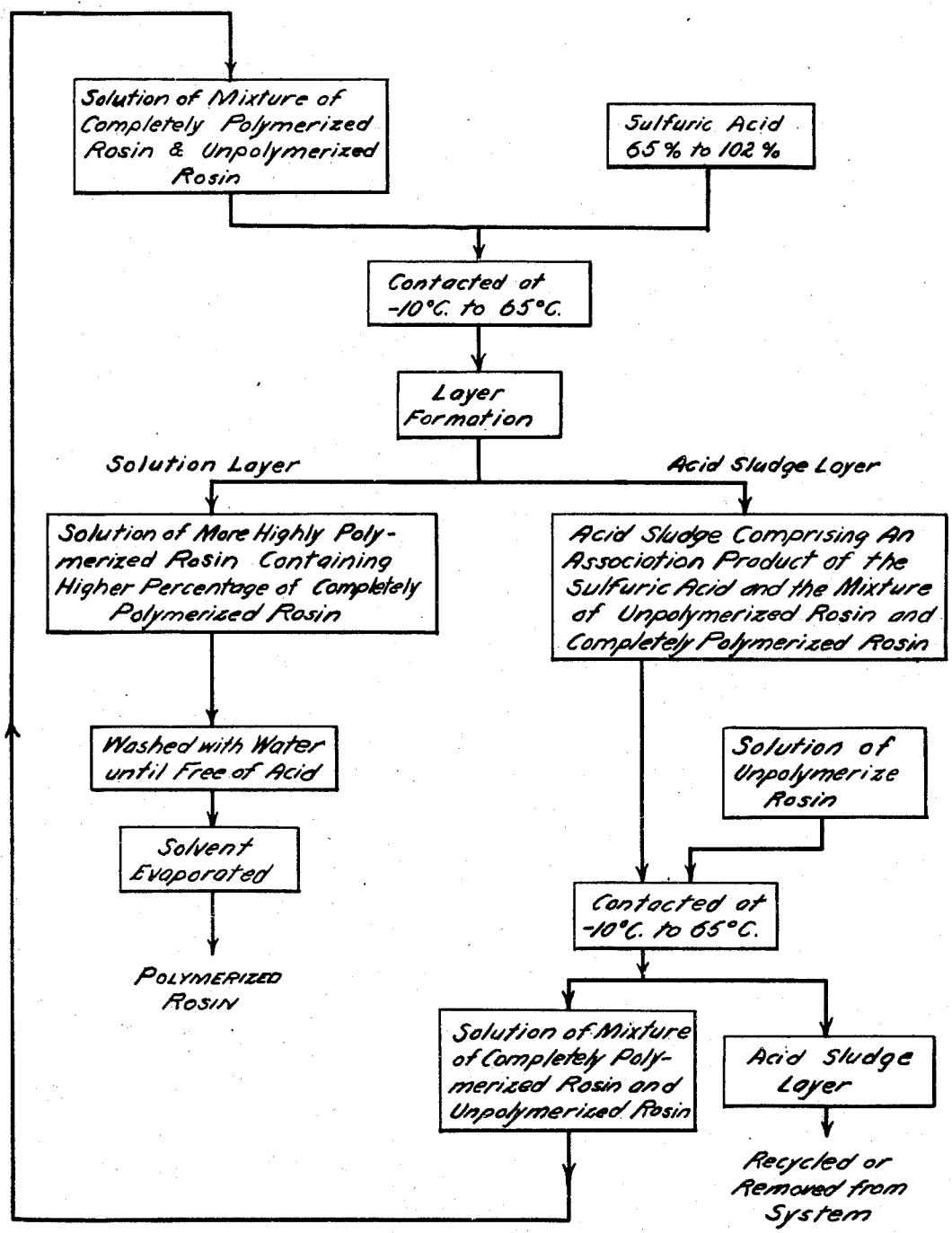
INVENTOR.
Clell E. Tyler
BY
ATTORNEY Patented Feb. 22, 1944

2,342,382

UNITED STATES PATENT OFFICE 2,342,382

METHOD OF POLYMERIZING ROSIN

Clell E. Tyler, Hattiesburg, Miss., assignor to Hercules Powder Company, Wilmington, Del., a corporation of Delaware Application July 4, 1942, Serial No. 449,781

8 Claims. (Cl. 260—97)

This invention relates to an improved continuous method for the polymerization of rosin.

In my copending application, Serial No. 328,864, filed April 10, 1940, now U. S. Patent No. 2,288,659, a process is disclosed for polymerizing rosin involving use as a polymerization catalyst of an acid sludge formed by treatment of rosin with sulfuric acid. I have now discovered an improvement over my previously described process which provides more rapid polymerization with use of less sulfuric acid. The improved process is entirely continuous and provides a polymerized rosin with very little drop in acid number.

It is well known that on subjecting rosin to polymerizing conditions in contact with various polymerization catalysts only a low order of polymerization occurs. The polymerization does not appear to proceed beyond the dimer stage. The dimer of a rosin of melting point of 80° C. has a melting point of approximately 175–180° C. Polymerized rosin thus has become generally known in the art as a mixture of the dimer and unpolymerized rosin. The polymerized rosin, therefore, contains varying proportions of the dimer and the unpolymerized rosin, depending on the degree of polymerization involved as indicated by the melting point, for example. The dimer is considered to be substantially completely polymerized rosin.

The improved polymerization process described in accordance with this invention involves continuously contacting a solution of a mixture of substantially completely polymerized rosin and substantially unpolymerized rosin in a suitable solvent at a temperature within the range of about —10° to about 65° C. with sulfuric acid of a concentration from about 65% to about 102% and in amount within the range of about 5% to about 50% by weight of the above polymerized and unpolymerized rosin mixture under conditions of reaction adapted to effect polymerization of the unpolymerized rosin contained in the above solution, thereby causing the separation of an acid sludge layer which is insoluble in the solvent and which comprises an association product of the sulfuric acid and the mixture of unpolymerized rosin and completely polymerized rosin. A separation is then effected between the separated acid sludge layer and the solution layer. The solution layer contains the substantially completely polymerized rosin in a higher proportion than present in the original solution and is washed with water until substantially free of acid and the solvent evaporated to free the desired polymerized rosin. The acid sludge layer is brought into contact with a solution of unpolymerized rosin in a suitable solvent at a temperature of about —10° C. to about 65° C. and such contacting is carried out for a sufficient time to effect substantial polymerization of the rosin. The solution of partially polymerized rosin is separated from the acid sludge layer and is recycled to the first step of the process. The acid sludge layer which is separated at this point is either recycled to the step involving contacting of acid sludge with the solution of unpolymerized rosin, or is brought into contact with a fresh amount of unpolymerized rosin solution, or it is removed from the system. Each of the above steps of the process is carried out in a continuous manner so that a continuous flow of materials takes place and a solution of polymerized rosin representing the desired degree of polymerization is delivered continuously from the operation. The system requires no interruption and is capable of very close and accurate control.

The flow sheet diagram illustrates the flow of materials in accordance with the process of the invention. The particular form of apparatus to be used in carrying out the process is not critical. A convenient form of apparatus which has been found to be very desirable consists of a pair of polymerizing vessels connected in series with each other. In the first of such a pair of polymerizing vessels the step of contacting the solution of the mixture of completely polymerized rosin and unpolymerized rosin with sulfuric acid is carried out, while in the second polymerizing vessel the contacting of the separated acid sludge from the first polymerizing vessel with the solution of unpolymerized rosin is carried out. In such a system, the finished polymerized rosin solution flows from the second of the pair of polymerizing vessels while the unpolymerized rosin solution enters the first polymerizing vessel.

Example I

In a typical run utilizing the improved process, the equipment included two polymerizing vessels of 16 gallon capacity connected in series and each having off-center propeller type agitators. Each of the polymerizers was equipped with a settling chamber at the top. The arrangement of the two polymerizers was such as to permit rosin solution to enter the bottom of the first polymerizer and sulfuric acid at the top of the second polymerizer. Before starting the operation, each polymerizer was filled with a 50% solution in benzol of a partially polymerized M wood rosin and an acid sludge produced by reaction of 95.5% sulfuric acid on a 50% solution of M wood rosin in benzol. The ratio of acid sludge to partially polymerized rosin solution introduced into the polymerizers was 15%. The operation was then carried out by pumping a 50% solution of M wood rosin in benzol into the bottom of the first polymerizer at a rate of 184 lbs. per hour and 95.5% sulfuric acid into the top of the second polymerizer at a rate of 14 lbs. per hour. The temperature of contacting in each polymerizer was maintained at 15–17° C. The ratio of acid sludge to rosin solution in each polymerizer during the operation was held constant at about 12 to 15%. The polymerized rosin solution flowing out of the second polymerizer was washed to remove residual acid and the solvent evaporated to give the finished polymerized rosin. The polymerized rosin obtained on the above basis had the following analysis:

|  | Original M wood rosin | Polymerized rosin |
|---|---|---|
| Acid No | 166 | 160. |
| Melting point (drop) | 82° C | 100° C. |
| Color | M | I to K. |

Refining of the polymerized rosin obtained by heating at 270° C. for 30 minutes improved the color to 23 Amber (WG grade) and removed all traces of residual sulfur.

*Example II*

In another typical run utilizing the same polymerizer set-up as above, each polymerizer was first filled with a 50% solution in benzol of a partially polymerized K gum rosin and an acid sludge produced by reaction of 96% sulfuric acid on a 50% solution of K gum rosin in benzol. The ratio of acid sludge to partially polymerized rosin solution introduced into the polymerizers was 25%. The operation was carried out as in the first run except that the acid sludge ratio was held at 20 to 25% in the polymerizers. The polymerized rosin recovered after washing of the solution flowing out of the second polymerizer and evaporation of the solvent had the following analysis in comparison to the original rosin:

|  | Original gum rosin | Polymerized rosin |
|---|---|---|
| Acid No | 168 | 164. |
| Melting point (drop) | 83° C | 102° C. |
| Color | K | K. |

The rosin which may be polymerized in accordance with the method of this invention may be any of the various grades of wood or gum rosin. It may have been previously heat-treated, distilled or refined by any of the processes known to the art. The crystalline rosin acids may also be used if desired. When treating wood rosin, a rosin is preferred which has been subjected to a refining operation for the removal of color bodies, although unrefined wood rosin may be treated according to the process. Any of the usual grades of gum rosin are well adapted for treatment by the process. Rosins which have been heat-treated prior to introduction in the process will, in general, given a polymerized rosin of higher melting point than obtainable from the corresponding rosin which has not been heat-treated.

The concentration of the mixture of completely polymerized rosin and unpolymerized rosin in the solution used for the contacting with the sulfuric acid as well as the concentration of the solution of unpolymerized rosin contacted with the acid sludge catalyst may vary over the range of about 10% to about 60% by weight and preferably will be within the range of from about 25% to about 55% by weight. Among the solvents for rosin which may be used are coal tar hydrocarbons, as for example, benzol, toluol, xylol; petroleum hydrocarbons, as for example, pentane, hexane, heptane, and various gasoline fractions, such as those boiling within the range from about 90° C. to about 175° C.; hydrogenated petroleum solvents, such as those known under the trade name of "Solvesso"; carbon tetrachloride, dichlorobutane, monochlorbenzene; cyclohexane, para-menthane, decahydronaphthalene, etc. The solvent used will be one in which the acid sludge catalyst is substantially insoluble. Of the solvents mentioned, benzol and the gasoline fractions are most preferred.

Referring to the flow sheet, the sulfuric acid used to contact the solution of a mixture of completely polymerized rosin and unpolymerized rosin may vary within the range of about 65% to about 102%, and preferably will be within the range of about 80% to about 100%. The amount of sulfuric acid used in the contacting step may be within the range from about 5% to about 50% by weight of the rosin, and preferably will be within the range of about 10% to about 25% by weight based on the rosin. The temperature at which this contacting step is carried out may be within the range from about −10° C. to about 65° C. and preferably will fall within the range of about 0° C. to about 25° C. At temperatures above about 25° C. slight reactions occur which tend to darken the rosin, while at temperatures below about 0° C. the viscosity of the sludge is greatly increased and the polymerization reaction proceeds much more slowly.

As will be apparent from the description of the process, the acid sludge catalyst is free-flowing in nature and thus is handled as a heavy liquid. The concentration of the rosin in the solvent and the particular solvent employed have some effect on the viscosity of the acid sludge. The concentration of the sulfuric acid also exerts an effect on the fluidity of the acid sludge. By suitable control of the rosin solution concentration, the strength of sulfuric acid and the temperature of contacting, it will be possible to maintain the conditions so as to provide a free-flowing acid sludge and thus facilitate the carrying out of the process.

The contacting of the solution of unpolymerized rosin with the acid sludge layer separated from the first contacting step may likewise be carried out at temperatures within the range of about −10° C. to about 65° C. and preferably from about 0° C. to about 25° C. The ratio of acid sludge to the unpolymerized rosin solution may be varied from about 5% to about 95%, while a preferable ratio will be about 12% to about 40% by weight. The concentration of unpolymerized rosin in the solution contacted with the acid sludge may vary over the range of about 10% to about 60% by weight, and preferably will be within the range of from about 25% to about 55% by weight. The time of contacting the unpolymerized rosin solution with the acid sludge catalyst will depend on the temperature of contacting and particularly on the concentration of sulfuric acid used in preparing the acid sludge. The solution of partially polymerized rosin containing a mixture of completely polymerized rosin and unpolymerized rosin which is obtained as a result of the contacting of the unpolymerized rosin solution with the acid sludge catalyst, is separated from the acid sludge layer and is recycled to the beginning of the process to be contacted with sulfuric acid, thereby to effect the production of a new acid sludge. The acid sludge layer separated from the contacting of the unpolymerized rosin solution with the acid sludge catalyst may be recycled and used to treat additional unpolymerized rosin solution, or it may be removed from the system. Also, a third polymerizing vessel may be used where the acid sludge is used to contact more unpolymerized rosin solution. With use of a third polymerizer vessel, higher throughput of unpolymerized rosin solution is obtained with a lower consumption of sulfuric acid.

By means of the improved process described in accordance with this invention the continuous production of polymerized rosin may be carried out with a high degree of efficiency and with production of a consistently uniform product. The melting point of the finished product may be varied easily by controlling the solution concentrations, the acid strength, the time of contact of the unpolymerized rosin solution with the acid sludge, as well as the temperature of contact. The process is particularly adaptable to smooth and efficient production of polymerized rosins melting up to about 135° C. In the case of polymerized wood rosin, such a polymerized product contains about 60 to 70% of the dimer and about 30 to 40% of the unpolymerized rosin. There is practically no loss of rosin in the process since the acid sludge catalyst removed from the system may be treated to recover the rosin contained in it. The spent acid sludge catalyst usually contains less than about 7% of the unpolymerized rosin introduced in the process. The yield of finished polymerized rosin without recovery of the rosin contained in the spent acid sludge is, therefore, usually at least about 93% by weight.

The polymerized rosin obtained in the above-described process may be subjected to refining treatment, such as heat treatment at 250° to 350° C. to remove the small traces of sulfur, selective solvent refining, treatment with nascent hydrogen, etc. Also, before washing the polymerized rosin solution, the crude solution may be subjected to a hydrolysis treatment with a strong polybasic mineral acid to facilitate the water washing step, such a hydrolysis procedure being described in an application of Alfred L. Rummelsburg, Serial No. 371,990, filed December 27, 1940, now U. S. Patent No. 2,300,065.

My above-described process of polymerizing rosin is an improvement over my previously described method referred to above in several important respects. Thus, it requires no interruptions and is entirely continuous. It provides faster throughput of rosin with a given amount of sulfuric acid and thus provides higher yields of polymerized rosin from a given weight of sulfuric acid or of acid sludge. Also, it is capable of much greater control than the previously described process and thus is more desirable from a commercial viewpoint. The polymerized rosin obtained by the improved process is of improved quality since less reduction in acid number takes place.

What I claim and desire to protect by Letters Patent is:

1. A continuous process of polymerizing rosin which includes continuously contacting a solution of a mixture of substantially completely polymerized rosin and substantially unpolymerized rosin in a suitable solvent at a temperature within the range of about —10° C. to about 65° C. with sulfuric acid of a concentration within the range of about 65% to about 102% and in an amount within the range of about 5% to about 50% by weight of the above polymerized and unpolymerized rosin mixture under conditions of reaction adapted to effect polymerization of the unpolymerized rosin contained in the mixture and thereby causing the separation of an acid sludge layer comprising an association product of the sulfuric acid and the mixture of unpolymerized rosin and completely polymerized rosin which is insoluble in the said solvent, removing polymerized rosin solution continuously from the separated acid sludge layer, continuously contacting the separated acid sludge layer with a solution of unpolymerized rosin in the same solvent at a temperature in the range of about —10° C. to about 65° C. to effect a partial polymerization of the said rosin into a mixture of substantially completely polymerized rosin and substantially unpolymerized rosin, separating the solution of the said mixture from the acid sludge catalyst layer and recycling the solution of the mixture of substantially completely polymerized rosin and substantially unpolymerized rosin to the first step of the process.

2. A continuous process of polymerizing rosin which includes continuously contacting a solution of a mixture of substantially completely polymerized rosin and substantially unpolymerized rosin in a suitable solvent at a temperature within the range of about —10° C. to about 65° C. with sulfuric acid of a concentration within the range of about 80% to about 100% and in an amount within the range of about 10% to about 25% by weight of the above polymerized and unpolymerzed rosin mixture under conditions of reaction adapted to effect polymerization of the unpolymerized rosin contained in the mixture and thereby causing the separation of an acid sludge layer comprising an association product of the sulfuric acid and the mixture of unpolymerized rosin and completely polymerized rosin which is insoluble in the said solvent, removing polymerized rosin solution continuously from the separated acid sludge layer, continuously contacting the separated acid sludge layer with a solution of unpolymerized rosin in the same solvent at a temperature in the range of about —10° C. to about 65° C. to effect a partial polymerization of the said rosin into a mixture of substantially completely polymerized rosin and substantially unpolymerized rosin, separating the solution of the said mixture from the acid sludge catalyst layer and recycling the solution of the mixture of substantially completely polymerized rosin and substantially unpolymerized rosin to the first step of the process.

3. A continuous process of polymerizing rosin which includes continuously contacting a solution containing about 10 to about 60% by weight of a mixture of substantially completely polymerized rosin and substantially unpolymerized rosin in a suitable solvent at a temperature within the range of about —10° C. to about 65° C. with sulfuric acid of a concentration within the range of about 65% to about 102% and in an amount within the range of about 5% to about 50% by weight of the above polymerized and unpolymerized rosin mixture under conditions of reaction adapted to effect polymerization of the unpolymerized rosin contained in the mixture and thereby causing the separation of an acid sludge layer comprising an association product of the sulfuric acid and the mixture of unpolymerized rosin and completely polymerized rosin which is insoluble in the said solvent, removing polymerized rosin solution continuously from the separated acid sludge layer, continuously contacting the separated acid sludge layer with a solution of unpolymerized rosin in the same solvent at a temperature in the range of about −10° C. to about 65° C. to effect a partial polymerization of the said rosin into a mixture of substantially completely polymerized rosin and substantially unpolymerized rosin, separating the solution of the said mixture from the acid sludge catalyst layer and recycling the solution of the mixture of substantially completely polymerized rosin and substantially unpolymerized rosin to the first step of the process.

4. A continuous process of polymerizing rosin which includes continuously contacting a solution containing about 25 to about 55% by weight of a mixture of substantially completely polymerized rosin and substantially unpolymerized rosin in a suitable solvent at a temperature within the range of about −10° C. to about 65° C. with sulfuric acid of a concentration within the range of about 65% to about 102% and in an amount within the range of about 5% to about 50% by weight of the above polymerized and unpolymerized rosin mixture under conditions of reaction adapted to effect polymerization of the unpolymerized rosin contained in the mixture and thereby causing the separation of an acid sludge layer comprising an association product of the sulfuric acid and the mixture of unpolymerized rosin and completely polymerized rosin which is insoluble in the said solvent, removing polymerized rosin solution continuously from the separated acid sludge layer, continuously contacting the separated acid sludge layer with a solution of unpolymerized rosin in the same solvent at a temperature in the range of about −10° C. to about 65° C. to effect a partial polymerization of the said rosin into a mixture of substantially completely polymerized rosin and substantially unpolymerized rosin, separating the solution of the said mixture from the acid sludge catalyst layer and recycling the solution of the mixture of substantially completely polymerized rosin and substantially unpolymerized rosin to the first step of the process.

5. A continuous process of polymerizing rosin which includes continuously contacting a solution containing about 25 to about 55% by weight of a mixture of substantially completely polymerized rosin and substantially unpolymerized rosin in a suitable solvent at a temperature within the range of about −10° C. to about 65° C. with sulfuric acid of a concentration within the range of about 80% to about 100% and in an amount within the range of about 10% to about 25% by weight of the above polymerized and unpolymerized rosin mixture under conditions of reaction adapted to effect polymerization of the unpolymerized rosin contained in the mixture and thereby causing the separation of an acid sludge layer comprising an association product of the sulfuric acid and the mixture of unpolymerized rosin and completely polymerized rosin which is insoluble in the said solvent, removing polymerized rosin solution continuously from the separated acid sludge layer, continuously contacting the separated acid sludge layer with a solution of unpolymerized rosin in the same solvent at a temperature in the range of about −10° C. to about 65° C. to effect a partial polymerization of the said rosin into a mixture of substantially completely polymerized rosin and substantially unpolymerized rosin, separating the solution of the said mixture from the acid sludge catalyst layer and recycling the solution of the mixture of substantially completely polymerized rosin and substantially unpolymerized rosin to the first step of the process.

6. A continuous process of polymerizing rosin which includes continuously contacting a solution containing about 25 to about 55% by weight of a mixture of substantially completely polymerized rosin and substantially unpolymerized rosin in a suitable solvent at a temperature within the range of about 0° C. to about 25° C. with sulfuric acid of a concentration within the range of about 65% to about 102% and in an amount within the range of about 5% to about 50% by weight of the above polymerized and unpolymerized rosin mixture under conditions of reaction adapted to effect polymerization of the unpolymerized rosin contained in the mixture and thereby causing the separation of an acid sludge layer comprising an association product of the sulfuric acid and the mixture of unpolymerized rosin and completely polymerized rosin which is insoluble in the said solvent, removing polymerized rosin solution continuously from the separated acid sludge layer, continuously contacting the separated acid sludge layer with a solution of unpolymerized rosin in the same solvent at a temperature in the range of about 0° C. to about 25° C. to effect a partial polymerization of the said rosin into a mixture of substantially completely polymerized rosin and substantially unpolymerized rosin, separating the solution of the said mixture from the acid sludge catalyst layer and recycling the solution of the mixture of substantially completely polymerized rosin and substantially unpolymerized rosin to the first step of the process.

7. A continuous process of polymerizing rosin which includes continuously contacting a solution containing about 25 to about 55% by weight of a mixture of substantially completely polymerized rosin and substantially unpolymerized rosin in benzol at a temperature within the range of about −10° C. to about 65° C. with sulfuric acid of a concentration within the range of about 65% to about 102% and in an amount within the range of about 5% to about 50% by weight of the above polymerized and unpolymerized rosin mixture under conditions of reaction adapted to effect polymerization of the unpolymerized rosin contained in the mixture and thereby causing the separation of an acid sludge layer comprising an association product of the sulfuric acid and the mixture of unpolymerized rosin and completely polymerized rosin which is insoluble in the benzol, removing polymerized rosin solution continuously from the separated acid sludge layer, continuously contacting the separated acid sludge layer with a solution of about 25% to about 55% unpolymerized rosin in benzol at a temperature in the range of about −10° C. to about 65° C. to effect a partial polymerization of the said rosin into a mixture of substantially completely polymerized rosin and substantially unpolymerized rosin, separating the solution of the said mixture from the acid sludge catalyst layer and recycling the solution of the mixture of substantially completely polymerized rosin and substantially unpolymerized rosin to the first step of the process.

8. A continuous process of polymerizing rosin which includes continuously contacting a solution containing about 10 to about 60% by weight of a mixture of substantially completely polymerized rosin and substantially unpolymerized rosin in a suitable solvent at a temperature within the range of about −10° C. to about 65° C. with sulfuric acid of a concentration within the range of about 65% to about 102% and in an amount within the range of about 5% to about 50% by weight of the above polymerized and unpolymerized rosin mixture under conditions of reaction adapted to effect polymerization of the unpolymerized rosin contained in the mixture and thereby causing the separation of an acid sludge layer comprising an association product of the sulfuric acid and the mixture of unpolymerized rosin and completely polymerized rosin which is insoluble in the said solvent, removing polymerized rosin solution continuously from the separated acid sludge layer, continuously contacting the separated acid sludge layer with a solution of about 10% to about 60% of unpolymerized rosin in the same solvent at a temperature in the range of about −10° C. to about 65° C. to effect a partial polymerization of the said rosin into a mixture of substantially completely polymerized rosin and substantially unpolymerized rosin, separating the solution of the said mixture from the acid sludge catalyst layer, recycling the solution of the mixture of substantially completely polymerized rosin and substantially unpolymerized rosin to the first step of the process and recycling the acid sludge catalyst.

CLELL E. TYLER.